United States Patent
Thies et al.

(10) Patent No.: US 11,434,388 B2
(45) Date of Patent: Sep. 6, 2022

(54) REFILL FOR WRITING, DRAWING AND/OR PAINTING DEVICES AND METHOD FOR THE PRODUCTION THEREOF

(71) Applicant: STAEDTLER Mars GmbH & Co. KG, Nuremberg (DE)

(72) Inventors: Andreas Thies, Effeltrich (DE); Martin Jakob, Hallstadt (DE); Jürgen Adler, Kleinseebach (DE)

(73) Assignee: STAEDTLER MARS GMBH & CO. KG, Nuremberg (DE)

( * ) Notice: Subject to any disclaimer, the term of this patent is extended or adjusted under 35 U.S.C. 154(b) by 0 days.

(21) Appl. No.: 15/025,632

(22) PCT Filed: Sep. 11, 2014

(86) PCT No.: PCT/EP2014/002461
§ 371 (c)(1),
(2) Date: Mar. 29, 2016

(87) PCT Pub. No.: WO2015/049026
PCT Pub. Date: Apr. 9, 2015

(65) Prior Publication Data
US 2016/0237295 A1    Aug. 18, 2016

(30) Foreign Application Priority Data

Oct. 1, 2013  (DE) .................... 10 2013 016 355.2

(51) Int. Cl.
| | | |
|---|---|---|
| *C09D 13/00* | (2006.01) | |
| *C08L 67/04* | (2006.01) | |
| *C08L 91/06* | (2006.01) | |
| *C08K 3/013* | (2018.01) | |
| *C08K 3/04* | (2006.01) | |

(52) U.S. Cl.
CPC .............. *C09D 13/00* (2013.01); *C08L 67/04* (2013.01); *C08L 91/06* (2013.01); *C08K 3/013* (2018.01); *C08K 3/04* (2013.01)

(58) Field of Classification Search
CPC ........ C09D 13/00; B43K 19/00; B43K 19/02; C08L 67/04; C08L 91/06; C08K 3/013; C08K 3/04
See application file for complete search history.

(56) References Cited

U.S. PATENT DOCUMENTS

| | | | |
|---|---|---|---|
| 2,988,784 A | 6/1961 | Lorenian | |
| 6,316,526 B1 | 11/2001 | Lugert | |
| 8,648,128 B2 | 2/2014 | Thies | |
| 8,747,003 B2 | 6/2014 | Thies et al. | |
| 2004/0096623 A1* | 5/2004 | Hashiba | .................. C08L 67/04 428/114 |
| 2006/0083151 A1* | 4/2006 | Kinoshita | .......... G11B 7/24094 |
| 2007/0197602 A1* | 8/2007 | Kanazawa | ........... A61K 31/192 514/335 |
| 2007/0289482 A1* | 12/2007 | Thies | ..................... B43K 19/18 106/31.11 |
| 2011/0104465 A1* | 5/2011 | Bilodeau | ............ A01G 13/0268 428/219 |
| 2011/0129284 A1* | 6/2011 | Thies | ..................... A45D 40/20 401/49 |
| 2012/0088422 A1* | 4/2012 | Kerstens | ............... B29C 44/329 427/244 |

FOREIGN PATENT DOCUMENTS

| | | |
|---|---|---|
| DE | 19855325 A1 | 6/1999 |
| EP | 2644407 A1 | 10/2013 |
| WO | 2010006742 A1 | 1/2010 |
| WO | 2010006744 A1 | 1/2010 |

OTHER PUBLICATIONS

Tony Rogers, "Everything You Need to Know About Polylactic Acid (PLA)", Oct. 7, 2015, pp. 1-10, obtained online from: Everything You Need to Know About Polylactic Acid (PLA).*
Fred W. Billmeyer, Jr, "Textbook of Polymer Science, 3rd Edition" John Wiley & Sons, Inc., New York p. 461 (1984).*
The Free Dicitonary, Definiion of remainder, pp. 1-6.*

* cited by examiner

*Primary Examiner* — Alexander C Kollias
(74) *Attorney, Agent, or Firm* — Lucas & Mercanti, LLP; Klaus P. Stoffel

(57) ABSTRACT

A polymer-bound refill for writing, drawing and/or painting devices, in particular for pencils or coloured pencils, including at least one binder, at least one wax, at least one colouring agent and at least one filler. The refill includes polylactide as binder.

5 Claims, No Drawings

REFILL FOR WRITING, DRAWING AND/OR PAINTING DEVICES AND METHOD FOR THE PRODUCTION THEREOF

The present application is a 371 of International application PCT/EP2014/002461, filed Sep. 11, 2014, which claims priority of DE 10 2013 016 355.2, filed Oct. 1, 2013, the priority of these applications is hereby claimed and these applications are incorporated herein by reference.

BACKGROUND OF THE INVENTION

The invention relates to refills for writing, drawing and/or painting devices/tools based on polymeric binders, and to a method for its manufacture.

Polymer refills based on polymers derived from crude oil for writing, drawing and/or painting are known in principle.

The term "coloured or graphite-based polymer-bonded refills for writing, drawing and/or painting" should be understood to mean on the one hand, refills which have been firmly fixed into wood or other materials which can easily be sharpened, and on the other hand, refills which are displaceably mounted in a rigid sheath. Examples in this regard are wooden pencils and refills for mechanical pencils, for example those known as retractable pencils or drop-action pencils. In this case, the refills usually have an external diameter in the range from approximately 0.3 mm to 6 mm.

Thus, for example, polymer-bonded coloured and graphite refills are known from WO 2010/006742 A1. Refills of this type contain a polymeric binder, wax, palm oil and fillers.

The disadvantage with refills of this type is that most polymeric refills are formed from crude oil products and thus are directly dependent on the price and availability of crude oil. Furthermore, the fact that refills produced from polymers derived from crude oil consume naturally available non-renewable resources is perceived to be a disadvantage. The ecological manufacture of a pencil from polymers based on renewable raw materials is thus not possible.

Furthermore, polymer-bonded coloured and graphite refills are know from U.S. Pat. No. 2,988,784 A. Refills of that type contain a polymeric binder based on cellulose ester, in particular cellulose acetate, wax and filler. The disadvantage with that type of refill is that although the refills are constructed from a natural raw material and thus are completely degradable, they are primarily made from wood, a naturally occurring raw material. Because of the high demand for wood, it is becoming more and more difficult and more and more expensive to source good quality wood. In addition, the diminishing availability of natural woods means that producing pencils with cellulose esters is highly desirable.

SUMMARY AND DESCRIPTION OF THE INVENTION

Thus, the object of the invention is to provide a refill for writing, drawing and/or painting which does not suffer from the disadvantages mentioned above, and which in particular can be produced without being dependent on crude oil, but purely from renewable and degradable binders/polymers without compromising the primary properties of being capable of being sharpened, coloration, strength, coverage and erasability of the refill.

The object is accomplished by substituting crude oil-based polymers with polylactides. Thus, a polymer-bonded refill is provided for writing, drawing and/or painting tools, in particular for pencils or coloured pencils which comprises at least one binder, at least one wax, at least one colorant and at least one filler, wherein the refill comprises polylactide as the binder.

Polylactic acid or PLA is a synonym for polylactide. The frequently used abbreviation PLA is derived from the English term "polylactic acid".

Surprisingly, it has been shown that by replacing crude oil-dependent polymers with polylactides, the properties, for example the capability of being sharpened, coloration, strength, coverage and erasability of a refill are not compromised, but its manufacture is independent of crude oil. In this manner, the manufacturing costs of the refill are no longer dependent on the prices and availability of crude oil. In addition, a refill manufactured in this manner degrades more quickly and manufacturing it saves on the consumption of naturally occurring, non-renewable resources.

The proportion of polylactide in the refill composition is in the range 10-60% by weight, preferably in the range 10% to 40% by weight and particularly preferably in the range 10-25% by weight.

A polymer-bonded refill composed of the following:

| | |
|---|---|
| 10% to 60% by weight | polylactide |
| 2% to 25% by weight | wax |
| 15% to 70% by weight | filler |
| 0 to 5% by weight | palm oil |
| 0 to 30% by weight | colorant | has been shown to be advantageous.

Advantageously, the at least one wax is at least one wax from the group comprising fatty acids, stearates, montan waxes, amide waxes and paraffin waxes. Mixtures of two or more waxes may also be employed.

Particularly preferably, the at least one wax is calcium stearate and/or an ethylene-bis-stearamide (EBS).

Very good results have been obtained with coloured refills when ethylene-bis-stearamide (EBS) is used. Using calcium stearate in lead pencil refills produces very good results.

Advantageously, the at least one filler is at least one filler from the group comprising graphite, hexagonal boronitride, phyllosilicates, chalk, barite, coloured pigments and/or non-coloured pigments.

Preferably, for pencil lead refills, graphite or graphite in combination with carbon black is used as the colouring filler. For coloured pencil refills, combinations of white or uncoloured fillers such as hexagonal boronitride, phyllosilicates etc., with colouring pigments such as azo pigments, phthalocyanines, dioxazines, quinacridones, iron oxides, carbon black, graphite, ultramarine, iron-cyano complexes have proved to be advantageous.

A preferred composition for a pencil lead refill comprises the following:

| | |
|---|---|
| 10% to 60% by weight | polylactide |
| 2% to 25% by weight | wax |
| 0 to 5% by weight | palm oil |
| remainder | graphite |

In particular, a pencil refill is composed of the following:

| | |
|---|---|
| 10% to 25% by weight | polylactide |
| 5% to 15% by weight | wax |
| 0.1% to 2.5% by weight | palm oil |
| remainder | graphite |

An exemplary formulation for a pencil lead refill comprises the following:

| polylactide | 20% by weight |
|---|---|
| calcium stearate | 9% by weight |
| palm oil | 1% by weight |
| graphite | remainder |

A further exemplary formulation for a pencil lead refill may have the following composition:

| polylactide | 38% by weight |
|---|---|
| calcium stearate | 7% by weight |
| ethylene-bis-stearamide | 5% by weight |
| palm oil | 1% by weight |
| graphite | remainder |

The graphite listed in the examples may act as the colorant for pencil lead refills. Similarly, however, combinations of graphite and carbon black may also be employed.

A composition for a coloured pencil refill comprises the following:

| 10% to 60% by weight | polylactide |
|---|---|
| 2% to 25% by weight | wax |
| 1% to 30% by weight | colorant |
| remainder | graphite |

In particular, a coloured pencil refill comprises the following:

| 10% to 25% by weight | polylactide |
|---|---|
| 10% to 20% by weight | wax |
| 2% to 20% by weight | colorant |
| remainder | graphite |

An exemplary formulation for a coloured pencil refill comprises the following:

| polylactide | 15% by weight |
|---|---|
| ethylene-bis-stearamide | 13% by weight |
| pigments | 7% by weight |
| fillers | 65% by weight |

Coloured and/or non-coloured pigments may be employed as the colouring agent in coloured refills. Examples of pigments of this type are azo pigments, phthalocyanines, dioxazines, quinacridones, iron oxides, carbon black, graphite, ultramarine and iron-cyano complexes.

An extrusion method has been shown to constitute an advantageous method for the manufacture of a polymer-bonded refill in accordance with the invention.

In particular, the refill in accordance with the invention is manufactured by carrying out the following steps:

mixing and granulating all of the components for the formulation of the refill in order to form a refill granulate extruding the refill granulate at a temperature in the range 120° C. to 200° C. in an extruder through a suitable die in order to form continuous refill rods cooling and solidifying the continuous refill rod, and cutting the continuous refill rod to final length, in particular to the required length of the pencil lead.

Depending on the extrusion head, the cross-section of the refill may have any form—round, square or combinations thereof. Furthermore, it is possible to carry out multiple co-extrusion of various refill formulations in one extrusion head in order to bind a multi-component refill.

Furthermore, a suitable co-extrusion method may be employed in order to extrude the refill granulate with other polymer-bonded materials so as to form a complete pencil lead.

We claim:

1. A polymer-bonded refill for writing, drawing and/or painting tools, comprising: a binder; a wax; graphite as a colorant; and a filler, wherein the filler includes graphite, wherein the binder is formed by 10-25% by weight of polylactide based on weight of the entire polymer-bonded refill composition, wherein the polymer-bonded refill is a pencil lead refill and includes the following:

| 5% to 15% by weight | wax |
|---|---|
| 0.1% to 2.5% by weight | palm oil |
| remainder | graphite. |

2. The polymer-bonded refill as claimed in claim 1, wherein the wax is at least one wax selected from the group consisting of fatty acids, stearates, montan waxes, amide waxes and paraffin waxes.

3. The polymer-bonded refill as claimed in claim 1, wherein the wax is ethylene-bis-stearamide (EBS) and/or calcium stearate.

4. A method for manufacturing the polymer-bonded refill as claimed in claim 1, comprising the steps of:

mixing and granulating the binder, the wax, the colorant and the filler to form a refill granulate; and extruding the refill granulate to form the polymer-bonded refill.

5. The method according to claim 4, including extruding the refill granulate at a temperature in a range of 120° C. to 200° C.

* * * * *